United States Patent [19]

Puddle et al.

[11] Patent Number: 4,924,057
[45] Date of Patent: May 8, 1990

[54] METHOD OF FORMING A JOINT BETWEEN ALUMINUM WORKPIECES WITH CURABLE ADHESIVE AND RESISTANCE WELDING

[75] Inventors: Mark W. Puddle; Nigel C. Davies, both of Banbury; William F. Marwick, Daventry; Peter G. Sheasby, Banbury, all of England

[73] Assignee: Alcan International Limited, Montreal, Canada

[21] Appl. No.: 193,106

[22] Filed: May 12, 1988

[30] Foreign Application Priority Data

May 13, 1987 [GB] United Kingdom ............... 8711295

[51] Int. Cl.⁵ .............................................. B23K 11/18
[52] U.S. Cl. .................................................. 219/118
[58] Field of Search ............................ 219/117.1, 118

[56] References Cited

U.S. PATENT DOCUMENTS 4,591,687  5/1986  Urech ................................. 219/118
4,633,054  12/1986  Patrick et al. ...................... 219/118
4,661,675  4/1987  Guthrie et al. ..................... 219/118

OTHER PUBLICATIONS

"Guidelines to Resistance Spot Welding Aluminum Automotive Sheet" the Aluminum Association, Inc.

*Primary Examiner*—Clifford C. Shaw
*Attorney, Agent, or Firm*—Cooper & Dunham

[57] ABSTRACT

The invention concerns a method of forming a joint between aluminium workpieces. These carry an artifically applied e.g. chromate or anodic oxide coating on their surface. A curable adhesive containing up to 40% by weight of particulate filler having a maximum particle size of 300 microns is provided between the workpieces to be joined. Resistance welding is performed using a welding electrode whose tip has a surface with an average roughness depth of at least 10 microns. This increases electrode life and makes it possible to use lower welding currents than previously recommended.

9 Claims, 1 Drawing Sheet

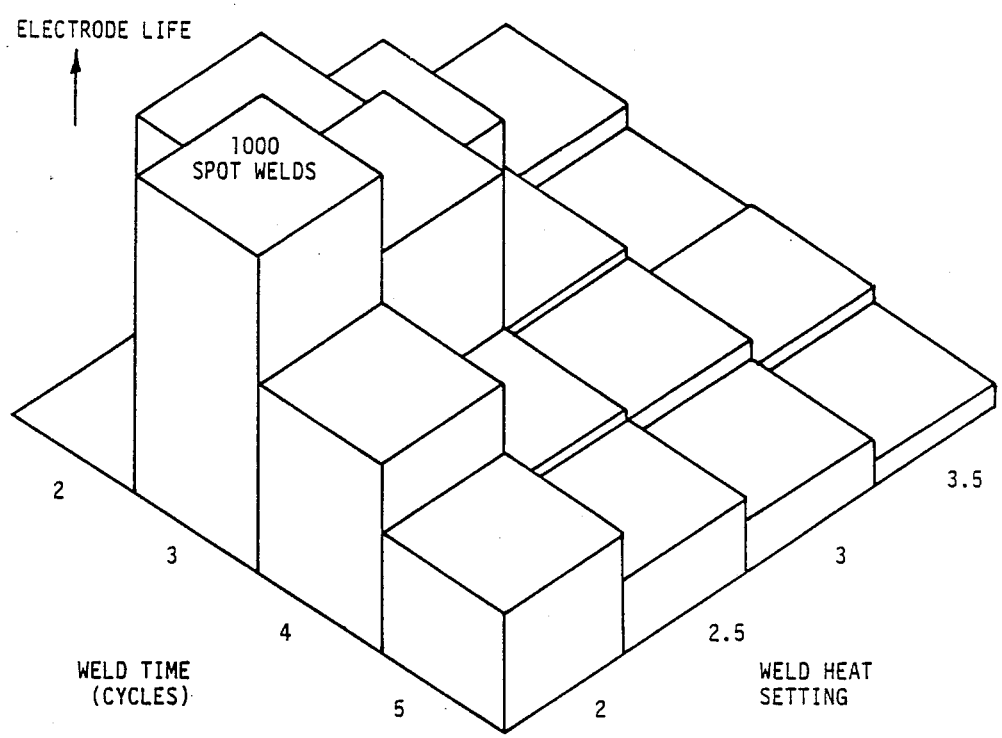

METHOD OF FORMING A JOINT BETWEEN ALUMINUM WORKPIECES WITH CURABLE ADHESIVE AND RESISTANCE WELDING

In aluminium resistance welding, pressure is applied to two or more contacting aluminium sheets by means of copper electrodes, while simultaneously passing a high electric current between the electrodes. Electrical heating causes a molten nugget to form at the sheet interface at the point of pressure. This technique is one of the most useful and practical methods of joining aluminium components, because it is suitable for volume production and reduces unit costs. Most wrought aluminium alloys, both the heat treatable and non-heat treatable types can be resistance welded.

The most important aspect of resistance welding is spot welding, involving the use of two small opposed electrodes. But other related techniques are known and used, including multiple spot welding (several electrodes simultaneously); projection welding (involving the use of projections on the workpiece); and roller spot welding such as seam welding (electrodes are wheels which traverse the workpiece under pressure).

It has been proposed to combine spot welding and adhesive bonding to form what has come to be commonly called a weld bond. Weldbonded joints can be stronger than joints either spot welded or bonded with adhesive alone; can provide a higher order of fatigue strength than spot welds alone; and can provide improved peel resistance compared to adhesive joints. The publication T14 of the Aluminum Association Inc., 1975, entitled "Adhesive Bonding of Aluminum Automotive Body Sheet Alloys" contains a discussion of weld bonding.

This invention is particularly, though not exclusively, concerned with automatic mass production by weldbonding involving resistance spot welding, e.g. of automotive bodies. "Guidelines to resistance spot welding aluminium automotive sheet" published as T10 by the Aluminum Association Inc. is relevant here. For these and other applications, electrode life is a major consideration. The lifetime of an electrode used for spot welding aluminium and its alloys is considerably lower than that of one used for steel. Furthermore, greater inconsistencies in weld quality are found with aluminium than with steel. There are two major reasons for this. Aluminum is a good thermal and electrical conductor (it has about ⅓ the bulk resistance of steel). Also, the oxide film on an aluminium surface acts as a high and often variable resistance interface between electrode and workpiece. Hence typically for mild steel the anticipated electrode life may be of the order of 4000 spot welds, whereas for aluminium it may be as low as 400.

An important aspect of resistance spot welding is the electrical resistance between electrode and workpiece (the interface resistance) and between workpiece and workpiece (the contact or faying resistance). The nugget is formed at the faying surfaces as a result of the heat produced by a short pulse of high amperage current. The various resistances of the interfaces are the governing factors in this process; a high resistance is needed at the faying surface to produce a weld, but a high outer interface resistance can result in overheating at the electrode/workpiece interface with deterioration of the electrode tip surface. Aluminium alloys in the mill finish condition suffer from this problem. Also, because of the inconsistency in the nature of the oxide film (particularly with alloys of the 5000 series of the Aluminum Association Inc. Register), the interface resistance can be variable, and the resultant weld quality erratic.

There have been proposals for producing aluminium alloy surfaces with differential surface resistance, i.e. a low interface resistance and a high faying resistance. These proposals include abrading the outer surface, arc cleaning of the outer surface (U.S. Pat. No. 3,278,720) and growing anodic oxide films of different thicknesses on the interface and faying surfaces (EPA 153149). Although these methods have increased electrode life, they may not be practical for operation in automatic mass production.

Another approach to increasing electrode life is described in G.B. No. 1,554,297. This approach involves treating the electrode surface in two ways. First, the surface is shot-peened, to provide a large number of minute indentations separated by relatively sharp ridges. Then the roughened surface is provided with a coating composed of nickel, beryllium, cobalt, iron, or a high melting alloy thereof. The specification teaches that the two treatments act synergetically, and that the shot-peening treatment by itself does not significantly increase electrode life.

When the weld quality starts to deteriorate, the electrode is removed from the welding equipment and re-dressed at a separate location. For a conventional copper-based electrode, re-dressing merely involves the use of cutters or sanding discs contoured to the proper radius and placed between the electrodes. For coated electrodes as described in G.B No. 1,554,297, re-dressing involves re-coating, which is time-consuming and expensive, and the initial coated electrodes are also expensive.

G.B. No. A 2,139,540 describes a method of fabricating a structure of aluminium components comprising the steps: pre-treating aluminium sheet to produce a surface layer thereon containing at least 5% by weight of chromium; forming components from the pre-treated sheet; applying adhesive to the components, and assembling them in the desired structure; spot-welding the components to give the structure green strength; and curing the adhesive. The combined techniques of spot-welding and adhesive bonding are known as weld-bonding. The stated purpose of the pre-treatment is to improve adhesive bond durability. The spot-welding step is not described in any detail.

According to the present invention, there is provided a method of forming a joint between aluminium workpieces which have an artificially applied strongly adherent coating on their surfaces at least at the location of the intended joint, which method comprises providing between faying surfaces of the workpiece a curable adhesive containing up to 40% by weight of particulate filler having a maximum particle size of 300 microns, providing a welding electrode whose tip has a surface with an average roughness depth $R_z$ of at least 10 microns, resistance welding the faying surfaces of the workpieces together, and curing the adhesive.

The sole FIGURE shows a representation of electrode life as a function of weld time and weld heat setting using the method of the invention.

The term "aluminium" is used herein to include not only the pure metal, but also Al rich alloys, particularly those of the kinds envisaged for vehicle construction such as the 2000 and 5000 and 6000 series of the Aluminum Association Inc. Register. Metal for spot-welding is generally 0.6 to 3.2 mm, most usually from 0.9 to 2.6 mm, thick.

In a preferred method of operating, the aluminium workpieces are coated with adhesive and assembled together in a jig. The adhesive may be applied by any suitable method and may be applied to form a layer from about 0.1 to 3.0 mm thick in the final joint depending on joint geometry. Spot-welds are then formed while the adhesive is still fluid, and these hold the structure together without jigging while the adhesive cures. The adhesive is usually cured by heating for 10 to 30 minutes at a temperature of 150° C. to 180° C. Epoxide adhesives are preferred, but other adhesives such as phenolic and polyurethane may be used. Toughened adhesives such as epoxide with a dispersed rubber or similar phase may also be used.

The adhesive used in the joints should be capable of retaining its strength under a wide variety of conditions such as temperature and humidity. The adhesive should wet the surface it is applied to but preferably be such that it does not sag or drip when applied to a vertical surface. Thixotropic materials achieved by incorporating a filler are thus preferred. However, the adhesive is preferably sufficiently fluid to be squeezed out of the way at locations in the joint where pressure is applied by a spot-welding tool. Adhesive not so pushed aside may prevent electrical contact between the metal surfaces and thus inhibit or prevent the formation of a weld. The type and concentration of filler present in the adhesive are important. If there is too much filler, or if the filler particle size is too large, then it is difficult to achieve satisfactory spot welds without the use of such a high welding current that electrode life is severely reduced. According to the invention, the adhesive contains no more than 40%, preferably no more than 30% by weight of particulate filler having a maximum particle size of 300 microns and preferably no more than 250 microns. The filler is typically a mineral filler including particles of irregular shape, and a small proportion of particles with a maximum dimension greater than 300 microns would not ruin the adhesive. Adhesives of this kind often also contain fibres, but the above limits do not include any fibre content. Although such adhesives sometimes also contain particulate metal, metallic fillers are less preferred in the adhesives used in the method of this invention. The method of this invention is particularly well suited for use with the AC type of spot welding machine that is conventionally used on automotive production lines. The welding machine is preferably of the AC type but the method of this invention can also be used with DC spot welders such as those typically used in the aircraft industry. Welding conditions, in particular weld time and weld current, depend to some extent on the thickness of the (sheet) components being welded together. The Aluminum Association T10 document contains the following recommendations:

TABLE AA

| Nominal thickness of thinnest sheet (mm) | Weld Time (cycles) | Welding Current (KA-RMS) as Received | Welding Current (KA-RMS) Mechanically Cleaned |
|---|---|---|---|
| 0.6 | 4 | 22 | 24 |
| 1.0 | 4 | 28 | 30 |
| 1.6 | 6 | 33 | 37 |
| 2.5 | 10 | 44 | 48 |

It turns out that electrode life is strongly dependent on both weld time and welding current, being enhanced by the use of low values for either, and preferably both, of these parameters. Thus for aluminium sheet up to 1.0 mm thickness a weld time of 2 to 4 cycles and an AC welding current (peak, not RMS) below 20 KA. The overall teaching therefore is: in order to enhance electrode life, use the lowest possible weld time and the lowest possible welding current sufficient to form a weld. It is preferred that weld current be less than 80% of the values recommended for mechanically cleaned surfaces in the aforesaid T10 document.

Resistance welding is performed using a welding electrode having a tip with a rough surface. Surface roughening of the electrode may involve the creation of ridges and indentations. Although applicants do not wish to be bound by theory, they currently believe that the ridges may be sharp enough to break through the insulating layers on the surface of the aluminium workpieces, and so create more contact points for current to flow from the electrode through the bulk aluminium. Surface roughening may conveniently be achieved by abrasive-blasting. The scale of roughness is important, and can be controlled by an appropriate choice of the particle size of the material used for abrasive-blasting and the pressure under which it is projected against the surface. Surface roughness, as measured by a perthometer and defined as the average peak-to-valley height (DIN 4768 paragraph 2 3.3.) that is the Average Roughness Depth, $R_z$, is at least 10 microns, preferably from 20 to 100 microns and more preferably from 20 to 80 microns. The conditions required to achieve this sort of surface roughness are within the skill of the art.

Conventional resistance spot-welding electrodes are made of alloys containing major proportions of copper. It is an advantage of this invention that such conventional electrodes can be used, after surface roughening, and without the need for a coating of any other metal or alloy.

It is well understood that there is a minimum acceptable nugget diameter for a successful spot weld, and that this minimum diameter increases for increasing metal thickness. It is also well understood that the nugget diameter formed by a conventional electrode pair under set conditions decreases with age, until the diameter becomes too small and the electrodes have to be replaced. To offset this it is conventional to provide an equipment set-up that will initially form nuggets that are too large by a factor of about 20%. For example, the Aluminum Association T10 document at page 9 gives the following figures:

| Metal thickness (mm) | Minimum Weld Nugget Diameter (mm) | Set up weld Nugget Diameter (mm) |
|---|---|---|
| 0.81 | 3.56 | 4.32 |
| 1.60 | 5.08 | 6.10 |
| 2.54 | 6.35 | 7.62 |

However, larger nugget diameters require increased welding current and result in shorter electrode working life.

When using roughened electrodes according to this invention, it has unexpectedly been found that, particularly with thinner gauge sheet, the nugget diameter formed by an electrode pair under set conditions increases with age, and only starts to decrease again shortly before eventual electrode failure. The reason for this may be that the roughened electrode tips gradually become flattened and spread with use. Whatever, the reason, this unexpected finding permits significant economies to be made in the welding set-up. Initial nugget diameters can be arranged to be no more than 15%, and often from 5% to 10%, greater than the minimum acceptable diameter. This change in practice reduces welding current requirements and further increases electrode working life.

According to another feature of this invention, the surfaces of the aluminium workpieces are provided with an artificially applied strongly adherent coating. It is an advantage that this invention permits the use of aluminium surfaces with equal consistent uniform interface resistances. The surfaces are preferably pretreated to an extent to provide intermediate interface electrical resistance. As noted above, too high a surface resistance can result in rapid deterioration of electrode tips. On the other hand, if the resistance at the faying surfaces is too low, a typical welding current may generate insufficient heat to form an adequate nugget and a strong weld.

Coating weights in the range 0.01 to 0.6, preferably 0.03 to 0.2, grams per square meter are preferred. In the presence of an adhesive, low coating weights may be preferable in order to reduce the faying resistance. The coatings can be formed by a variety of pretreatments.

One suitable pretreatment is that marketed by Pyrene Chemical Services Ltd. under the Trademark Bonderite 735. The surface layer is believed to consist essentially of hydrated chromium phosphate, with small amounts of chromium oxide and aluminium fluoride present close to the aluminium/conversion coating interface. A recommended process sequence is spray acid clean, spray water rinses, spray application of conversion coating, spray water rinses, hot air drying.

Another preferred pretreatment is that marketed by Albright & Wilson Limited under the Trademark Accomet C. This is a "no rinse" treatment and is of particular interest for coil coating purposes as it involves roller application of a chromate based coating which is non-reactive and requires no subsequent rinsing. This minimises the effluent treatment required and makes the process relatively simple to control. A recommended process sequence is spray acid clean, spray water rinses, roller-coat application of Accomet C, dry.

Other suitable pretreatments include alternative chromate-phosphate coatings such as that marketed by ICI plc under the Trademark Alodine 407/47. Also suitable are anodizing treatments, for example AC anodizing in hot sulphuric acid (British Patent Specification No.1235661); anodizing in phosphoric acid containing electrolytes (GB No. 2167443A); and the various treatments described in GB 2139540 A.

Organic coatings such as paints or lacquers are not strongly adherent and are not suitable.

The examples below show that the various features of this invention can be used in combination to increase electrode service life by a factor of up to 50 or even greater. They also show that, over quite a wide range of electrode surface roughening and particularly with thinner gauge sheet, electrode life can be increased to more than 2000 welds. This figure of 2000 successful welds without a change of electrodes is important, since this is the number of welds made per shift in a typical line. No great expense is involved in changing and re=-dressing electrodes between shifts. Since electrode life is only one of the factors involved in costing the overall resistance weld bonding process, adhesive characteristics and electrode tip roughness other than those which give rise to the highest possible electrode life may be preferred for other reasons. For example for weld-bonding, a treatment which gives superior adhesive bond durability may be preferred to one which gives exceptionally high electrode life.

EXPERIMENTAL

In Examples 1 to 3 the spot-welding equipment was an AC 110 KVA mobile welder with integral transformer supplied by a solid state sequence control system. A weld sequence was set up such that the nugget diameter was above the minimum required by the Aluminum Association T10 document (Guidelines to resistance spot welding of automotive sheet). The welding sequence used was generally as follows:

| | |
|---|---|
| Pre-squeeze | 60 cycles |
| Weld Time | 3 cycles |
| Post-squeeze | 20 cycles |
| Off | 40 cycles |
| Current | 14–16 KA (Peak) |
| | (Heat set 2.5) |
| Electrode Approach Rate | 50 mm/sec |
| Weld Load | 3.75 KN (825 lbs) |
| Set-up diameter | 4.0 mm nugget diameter |
| | for 0.875 mm gauge sheet |
| Electrode | 76 mm radius electrodes |
| | (Cu—Cr alloy) |
| Strip size | 25 mm × 750 mm |
| Weld space | 25 mm |
| Welding rate | up to 30 welds/min |
| Strip feed | manual |

The electrode life was defined by the number of acceptable welds made with a set of electrodes without electrode dressing and without any changes in the set welding conditions. Every spot weld was examined. The test was considered complete when any of the following conditions were met:

1. If four or more welds in a unit of 40 spot welds failed to peel.
2. The average button diameter was below the minimum value given in the Aluminum Association T10 document (i.e. below 3.6 mm).
3. The average single spot shear strength was below the minimum given in the AA T10 document
4. A hole was blown in the sheet during welding.
5. The electrode pulled a plug out of the sheet.

Reference is directed to the accompanying drawing, which is a 3-dimensional schematic diagram showing the relationship between weld time, weld heat and electrode life.

EXAMPLE 1

AA 5251 alloy sheet was used of 0 temper and 0.875mm gauge. The sheet had been coil pretreated with the pretreatment Accomet C, a no-rinse chromate-based coating. The resistance of the pretreated material had been measured as 59 microhms for the interface and 26 milliohms for the faying resistance.

The sheet was then coated on both surfaces with a water-based wax lubricant. Coating weight was approximately 5 g/m².

An adhesive was applied on the faying surface of each strip sample prior to welding. The adhesive used was a heat-curable toughened epoxy adhesive (Adhesive A), which had a filler content of approximately 25% by weight and a filler particle size in the range 20–200 microns. Another sheet of the same alloy was used in the mill finish condition with adhesive present for comparison.

Nine types of electrode roughness were considered. These were new "as supplied" electrodes from the manufacturer and electrodes shot-blasted to eight different surface conditions. The relationships between the roughness of the electrode, electrode life and the number of failures are shown in Table 1. For comparison, values with mill finish AA 5251 alloy sheet are also shown. With this material heat settings had to be increased to 23 KA In order to produce a satisfactory spot-weld. The increased electrode life from using lubricated, pretreated sheet is demonstrated, as is the benefit of roughness of the electrodes.

Typical shear strengths of the spots throughout the experiment were between 350 and 400 lbs/spot, which is higher than the AA T10 recommendation. The quality of the welds was also excellent with little or no expulsion.

An important consequence of these experiments is that during the electrode life tests, the nugget diameters increased with time. Typically during electrode life trials, a higher nugget diameter than the minimum is chosen and during the trial the nugget diameter will gradually fall towards the minimum value. However previous experiments to this trial, using similar spot welding conditions, had indicated that initially there was flattening of the electrode surface coinciding with an increase in the nugget size. For example in the trials above, the initial nugget diameter was 4.00 mm, only about 10% more than the minimum acceptable diameter of 3.6 mm. This gradually rose to 5.0 mm and remained constant for the rest of the electrode life until close to failure. The effect is assumed to be associated with electrode flattening coupled with a lack of electrode pick-up.

EXAMPLE 2

Another important factor concerning the increase of electrode life is the control of the total energy input during the weld sequence. We have found that in order to achieve good electrode life the weld current and/or weld time should be set as low as possible. For conventional spot welding of aluminium the weld current is set at 20 KA or higher and a weld time of about 5 cycles is used (for example for 1 mm gauge aluminium sheet). In the work that we have carried out with pretreated aluminium and 76 mm radius roughened electrodes, the welding currents have typically been of the order of 14–16 KA with a weld cycle time of 3 cycles. In a series of experiments carried out under similar conditions to those in Example 1, and again using Adhesive A the effects of current setting and weld cycle times were demonstrated. The results are shown schematically in the FIGURE. The electrodes were roughened by abrasive blasting with 40/20 recycled grit at 80 psi for 10 seconds, to give an $R_z$ value of 28 microns which is not the optimum level. It can be seen from the FIGURE that the lower weld current combined with the shorter weld times give increased electrode life. Again good quality spot welds above the AA T10 recommendations were produced, but eventually a point was reached when the current applied was insufficient and produced either high failure rates or a total inability to produce a spot-weld.

EXAMPLE 3

Pretreated sheet of 1.2 mm gauge was prepared as in Example 1, to show that longer electrode life can also be achieved on thicker material.

Three types of electrode roughness were considered. The results are shown in Table 2. The welding parameters were changed slightly from those used on 0.875 mm sheet, that is, the current was increased to approximately 14 KA (Peak) and the weld load to 4.20 KN (925 lbs) to compensate for the higher gauge. All other sequence parameters were the same as before. Throughout the experiment the quality of the spot welds was excellent. The effect of electrode roughness on electrode life was similar to the previous example with 0.875 mm sheet

EXAMPLE 4

In order to establish spot-weldability in the presence of different single part epoxy adhesives, four adhesives—B, C, D and E were applied to strip samples using the procedure described in Example 1.

For this experiment a DC 75 KVA pedestal welder with a solid state control system was used. The welding sequence used was as follows:

| | |
|---|---|
| Squeeze | 20 cycles |
| Initial pressure | 40 cycles |
| Weld Heat Time | 5 cycles |
| Forge Delay | 3.5 cycles |
| Quench | 3 cycles |
| Hold | 5 cycles |
| Off | 20 cycles |
| Current | 19 K Amps (RMS) |
| Electrode Approach Rate | 26 mm/sec |
| Weld Load | 2.35 KN (520 lbs) |
| Forge Load | 5.0 KN (880 lbs) |
| Set up Diameter | 3.8 mm nugget diameter for 0.875 mm gauge sheet |
| Electrode | 76 mm radius electrodes (Cu—Cr alloy) |
| Strip size | 25 × 1000 mm |
| Weld Space | 25 mm |
| Welding Rate | up to 30 weld/min |
| Strip Feed | manual |

Accomet C pretreated material was used without the presence of lubricant, and electrodes were used in the as-supplied conditions. Higher currents and longer weld cycle times were used In this experiment, owing to the current characteristics of the DC welding machine and the lower current efficiency of the remote transformer.

Conditions for spot-welding in the presence of adhesive had not been optimised but the results in Table 3 indicate the effect of both filler quantity and filler particle size.

Adhesive B has a large amount of filler present and this gives a poor electrode life with a high failure rate. Adhesive C has a lower filler content, but large particle size, and this gives improved tip life, but a large number of failures owing to the difficulty of bringing the faying surfaces together under the weld pressure. Adhesive D and E are preferred adhesives with lower filler contents and/or smaller particle size. Adhesive D, which is similar in filler characteristics to Adhesive A gave further improvement in tip life with a low failure rate.

EXAMPLE 5

Example 1 shows the benefits of roughening the electrode surfaces when using an AC mobile spot welder. Table 1 gives an optimum electrode roughness of 48 microns. Electrodes of the optimum roughness were used on the DC characteristic 75 KVA pedestal welder, to show that the beneficial effects of electrode roughening can be demonstrated on spot-welding machines of different types and output characteristics. As supplied and bright polished electrodes were also used to give a comparison. The welding sequence used was as shown in Example 4 Accomet 'C' pretreated material was used with lubricant and adhesive A present These results are shown in Table 4.

It can be seen from Table 4 that the effect of electrode roughening is similar to that produced on the AC spot welder. Life figures are lower in general than produced in Example 1, but this is due to the welding sequence not being optimized.

EXAMPLE 6

This Example shows application of the method to 2 mm thick sheet. The sheet was of 5251 alloy pretreated with Accomet C, with lubricant and Adhesive D present. The welding equipment was a KT-8110 AC. spotwelder operated under the following conditions:

| | |
|---|---|
| Squeeze | 50 cycles |
| Initial pressure | 30 cycles |
| Weld heat time | 10 cycles |
| Forge delay | 0 cycles |
| Quench | 40 cycles |
| Off | 40 cycles |
| Current | 24 KA (RMS) |
| Electrode approach rate | 100 mm/sec |
| Weld load | 7 KN |

The following results were obtained:

| Average roughness Rz (microns) | Electrode Life (welds) | Failures (number) |
|---|---|---|
| 42 | 255 | 14 |
| 1.1 | 109 | 8 |

Electrode life is shorter when thicker sheet is being welded. But these figures clearly demonstrate the improved electrode life that results from roughening treatment.

TABLE 1

Relationship between electrode roughness, sheet surface and electrode life for Accomet C pretreated and a mill finish 5251 alloy sheet of 0.875 mm gauge with lubricant and adhesive present.

| Surface Treatment | Electrode Preparation | Average Roughness (microns) | Welding Current (KA) | Electrode Life | Failures No | % |
|---|---|---|---|---|---|---|
| Accomet C (equivalent to 0.1–0.15 g/m²) | As supplied | 3.8 | 14 (Heat set 2) | 30 | 3 | 10 |
| Accomet C | 180/220 Al₂O₃ 80 psi, 10 secs | 11.3 | 16 (Heat set 2½) | 359 | 24 | 6.7 |
| Accomet C | 40/20 Recycled Grit: 80 psi 10 secs | 28.1 | 16 | 600 | 26 | 4.3 |
| Accomet C | 36 mesh Al₂O₃ 20 psi 10 secs | 31.7 | 16 | 1868 | 97 | 5.2 |
| Accomet C | 36 mesh Al₂O₃ 40 psi 10 secs | 42.0 | 16 | 2441 | 88 | 3.6 |
| Accomet C | 36 mesh Al₂O₃ 60 psi 10 secs | 48.0 | 16 | 2439 | 73 | 3.0 |
| Accomet C | 36 mesh Al₂O₃ 80 psi 10 secs | 51.0 | 16 | 2250 | 55 | 2.4 |
| Accomet C | 20 mesh Al₂O₃ 80 psi 10 secs | 68.4 | 16 | 1534 | 43 | 2.8 |
| Mill Finish | As supplied | 3.8 | 23 (Heat set 4) | 58 | 8 | 13.5 |
| Mill Finish | 40/20 Recycled Grit: 80 psi 10 secs | 28.1 | 23 | 106 | 13 | 12.5 |

TABLE 2

Relationship between electrode roughness, sheet surface and electrode life for Accomet C pretreated sheet of 1.2 mm gauge with lubricant and adhesive present.

| Surface Treatment | Electrode Preparation | Average Roughness (microns) | Welding Current (KA) | Electrode Life | Failures No | % |
|---|---|---|---|---|---|---|
| Accomet C | As supplied | 3.8 | 20 (Heat set 3) | 24 | 8 | 33 |
| Accomet C | 40/20 Recycled Grit: 80 psi | 28.1 | 16 (Heat | 265 | 12 | 4.5 |

TABLE 2-continued

Relationship between electrode roughness, sheet surface and electrode life for Accomet C pretreated sheet of 1.2 mm gauge with lubricant and adhesive present.

| Surface Treatment | Electrode Preparation | Average Roughness (microns) | Welding Current (KA) | Electrode Life | Failures No | % |
|---|---|---|---|---|---|---|
| Accomet C | 10 secs 36 mesh Al$_2$O$_3$ 20 psi 10 secs | 31.7 | set 2½) 20 | 1680 | 75 | 4.5 |

TABLE 3

The effect of adhesive type on spot-weldability

| Adhesive Designation | Filler Content % | Filler Particle Size Range | No. of Welds | Failures No | % |
|---|---|---|---|---|---|
| B | 47 | 15–50 | 72 | 6 | 8 |
| C | 18 | 100–400 | 145 | 33 | 23 |
| D | 25 | 20–200 | 160 | 0 | 0 |
| E | 10 | 20–200 | 426 | 4 | 1 |

TABLE 4

Relationship between electrode roughness and electrode life for Accomet 'C' pretreated 5251 alloy of 0.875 mm gauge, with lubricant and adhesive present, using the DC characteristic pedestal welder.

| Surface Treatment | Electrode Preparation | Average Roughness (Microns) | Electrode Life | Failure No | % |
|---|---|---|---|---|---|
| Accomet 'C' | 36 Mesh Al$_2$O$_3$ 60 Psi 10 Secs | 48.0 | 1258 | 41 | 3.3 |
| Accomet 'C' | As Supplied | 3.8 | 117 | 3 | 2.6 |
| Accomet 'C' | Polished | 1.2 | 148 | 4 | 2.7 |

We claim:

1. A method of forming a joint between aluminium workpieces which have an artificially applied strongly adherent coating on their surfaces at least at the location of the intended joint, which method comprises providing between faying surfaces of the workpiece a curable adhesive containing up to 40% by weight of particulate filler having a maximum particle size of 300 microns, providing a welding electrode whose tip has a surface with an average roughness depth $R_z$ of at least 10 microns, resistance welding the faying surfaces of the workpieces together, and curing the adhesive.

2. A method as claimed in claim 1, wherein the adhesive is sufficiently fluid to be pushed aside under the conditions used for resistance welding.

3. A method as claimed in claim 1, wherein the adhesive contains up to 30% by weight of particulate filler having a maximum particle size of 250 microns.

4. A method as claimed in claim 3, wherein the surface of the tip has an average roughness depth $R_z$ from 20 to 100 microns.

5. A method as claimed in claim 1, wherein the adherent coating is present at a rate of from 0.01 to 0.6 g/m$^2$.

6. A method as claimed in claim 1, wherein the adherent coating is present on the entire major surfaces of both workpieces.

7. A method as claimed in claim 1, wherein the resistance welding is spot welding.

8. A method as claimed in claim 7, wherein resistance welding is performed by the use of a welding current less than 80% of that recommended by the Aluminum Association T10 document as set out in Table AA of the present specification.

9. A method as claimed in claim 1, wherein the aluminium workpieces are components formed and weldbonded together to form a load-bearing structure for a motor vehicle.

* * * * *